INVENTOR
HARRY D. EVANS
RICHARD R. HUGHES
BY *Oswald H. Milmore*
THEIR ATTORNEY

Jan. 7, 1958  H. D. EVANS ET AL  2,819,206
DISTILLATION APPARATUS WITH VORTEX CHAMBER AND STRIPPER
Filed June 24, 1955  2 Sheets-Sheet 2

INVENTORS
HARRY D. EVANS
RICHARD R. HUGHES
BY *Oswald H. Milmore*
THEIR ATTORNEY

2,819,206

DISTILLATION APPARATUS WITH VORTEX CHAMBER AND STRIPPER

Harry D. Evans, Oakland, and Richard R. Hughes, San Anselmo, Calif., assignors to Shell Development Company, New York, N. Y., a corporation of Delaware Application June 24, 1955, Serial No. 517,806

8 Claims. (Cl. 202—153)

The invention relates to distillation apparatus including a vortex section to which the feed mixture to be fractionated is fed tangentially to form a vortex and separate liquid by centrifugal force from vapor, the latter being discharged at the top (if desired into the bottom of a fractionating column) and the former being discharged at the bottom into a stripping section to the bottom of which a stripping medium, such as steam, is charged to strip out volatile components from the residual liquid before the latter is discharged. It finds particular, although not exclusive, application in the flash vaporization of residual petroleum fractions, such as topped crude oil.

In such apparatus the stripping medium and the volatile components flow as a gaseous mixture from the top of the stripping section into the vortex section to join the vapors for discharge therewith from the top of the vortex section. The return of the gaseous mixture to the vortex section has been found to interfere with the separating efficiency within the vortex section in apparatus of known designs in that it interferes with the passage of liquid into the stripping section and causes entrainment of said liquid in the stream discharged at the top. This difficulty is especially severe when, as is usual, the apparatus is operated at greatly reduced pressures at which large volumes of the gaseous mixture are involved.

It is an object of this invention to provide an improved distillation apparatus of the type indicated having an improved construction of the vortex section and the top of the stripping section for promoting the smooth passage of the gaseous mixture from the stripping section into the vortex section without entrainment of separated liquid, and for improving the separating efficiency of the vortex section.

A further object is to improve the construction of the means by which the separated liquid from the vortex section is transferred to the stripping section for reducing holdup and thereby reducing the time during which the liquid is maintained at the elevated temperature prevailing in the apparatus, to reduce the tendency toward coking and similar undesired reactions.

In summary, according to the invention there is provided between the vortex section and the contacting tray or trays of the stripping section a plate having a central tubular riser extending upwards into the vortex section and communicating with the space beneath the plate through an opening, the said riser defining between itself and the outer wall an annular liquid-collecting basin, and a liquid-downcomer duct extends from the said plate to the contacting tray of the stripping section, viz., to the uppermost tray when there is a plurality of trays, for leading the liquid onto the said tray isolated from the gaseous mixture of stripping medium and volatile components. The downcomer preferably has the top thereof situated at the level of the top of said plate and the plate is preferably unobstructed at the tray level so as to insure free drainage of liquid to reduce the height of the body of liquid collected on the plate.

According to another feature of the invention a plurality of vortex-breaker blades are provided in the annular liquid-collecting basin to arrest the whirl of the collected liquid. It is advantageous to mount the blades vertically and substantially radially and to provide the blades with upper edges that slope downwardly from the top of the tubular riser toward the outer wall of the vortex chamber; this improves the flow patterns of the vapor in the vortex section and reduces entrainment of liquid.

Still another feature the tubular riser is provided with is one or more outwardly directed flanges for reducing the creep of liquid from the annular liquid-collecting basin to the top of the riser where the liquid would be entrained by the gaseous mixture flowing out of the riser.

The invention will be further described with reference to the accompanying drawings forming a part of this specification and showing by way of example one preferred embodiment wherein all of the several above-mentioned features are incorporated, the several views being as follows.

Figure 1:
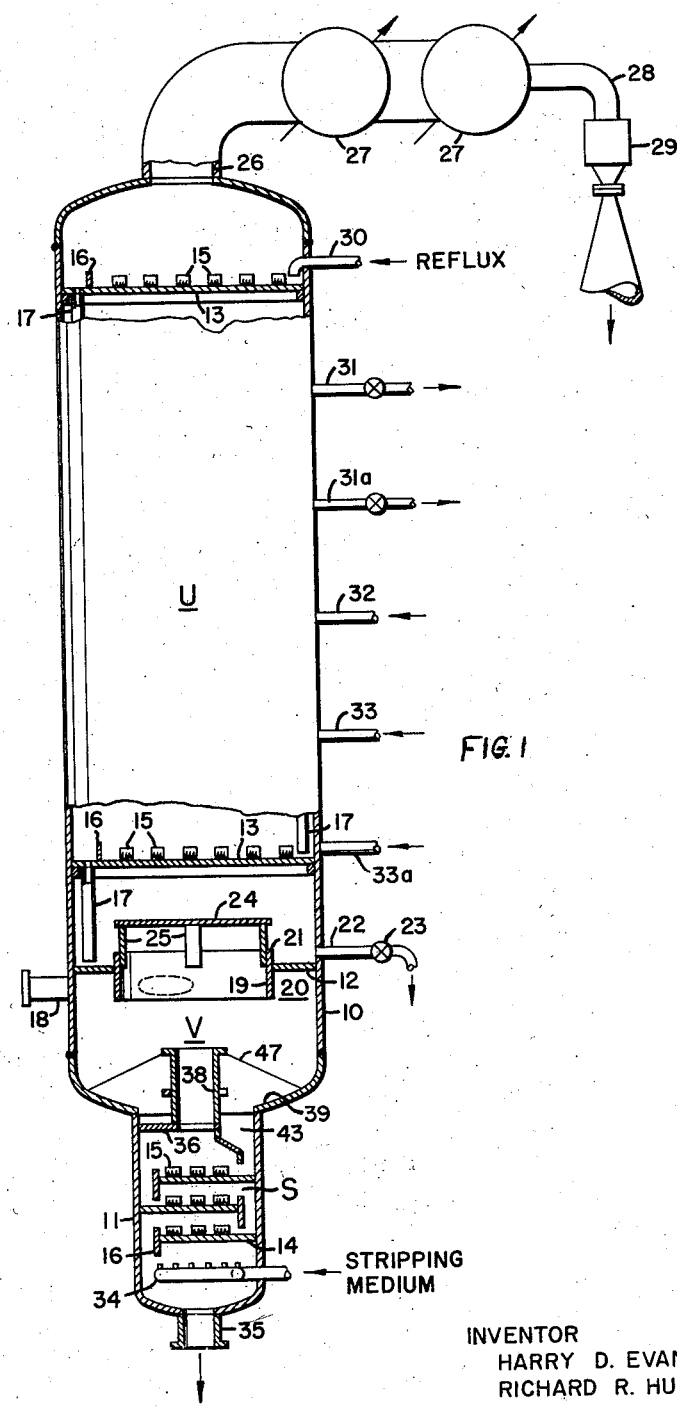
Figure 1 is an elevation of a complete distillation column wherein the invention is applied, parts being broken away.

Referring to the drawings in detail, the apparatus includes upper and lower shells 10 and 11, the former shell enclosing an upper distillation section U (above the plate 12) and a lower vortex section V, and the latter shell being of reduced diameter and enclosing a stripping section S. Sections U and S contain gas-liquid contact trays of any suitable design, e. g., vertically spaced trays 13 and 14, respectively, provided with bubble caps 15, overflow weirs 16 and downcomer passageways or ducts 17; however, the invention is not restricted to such trays and trays of other types, such as grid or stamped trays with or without downcomers, and shower deck trays, may be used. Also, it is evident that the invention is not restricted to fractional distillation or stripping sections, wherein a plurality of trays are used. The vortex section has one or more tangential inlet pipes 18 through which the mixture to be distilled is introduced just beneath the plate 12 in a direction to form a vortex about the vertical central axis. This plate forms the top of the vortex section and has any conventional or suitable opening for the upflow of vapor from the central part of section V into the bottom of section U; thus, the plate 12 may have a large central circular opening within which is mounted a riser tube or ring 19 that extends downwards preferably to a level below the bottom edge of the inlet 18 to define an annular vortex space 20. When the plate 12 is to function as a liquid draw-off tray this ring also extends somewhat above the plate, to form an annular dam 21; liquid may then be drawn off through a pipe 22 having a valve 23. The top of the opening is covered by a circular plate 24 held above the top of the ring by supports 25 that provide intervening vapor passages. The top of the section U is connected by a vapor outlet 26 to a series of condensers 27 and the condensate line 28 may be provided with one or more eductors 29 for evacuating the distillation column to the extent desired, e. g., to lower the absolute pressure within the vortex section V to 30–60 mm. of Hg. Reflux liquid is admitted to the top of section U through a pipe 30 from any source, e. g., from the line 28 by suitable connections not shown. Various cuts may be withdrawn from the section U at appropriate trays through lines represented at 31 and 31a, while portions of the withdrawn material and/or treating agents may be admitted or re-admitted at suitable levels, e. g., through a pipe 32. In certain operations caustic, such as soda or lime, is admitted through pipes 33 and/or 33a. Liquid from the outer part of the section V flows down into the stripping section S to the bottom of which a stripping medium, such as steam, is admitted through a perforated inlet pipe 34. This medium is brought into contact with the liquid by traversing the several trays 14 in succession through the bubble caps and thereby flowing through the bodies of liquid on these trays to strip from them volatile components; the resulting gaseous mixture of volatile components and stripping medium flows up into the section V, while the residual liquid is discharged through a bottom outlet 35.

The parts described in the foregoing paragraph are known in the art and no detailed description is believed to be required. It may be stated, however, for a better understanding of the invention that numerous changes both in the structural details and in the operating conditions are possible. Thus, when the unit is operated under the low pressures indicated and a hot residual lubricating oil fraction is admitted through the inlet 18 entirely or predominantly in the liquid state, the vortex section V functions additionally as a vaporizing section in that the volatile constituents of the feed stream are flashed. However, it is also possible to admit a stream that has been previously flashed, e. g., at a pressure which is only negligibly higher than that prevailing in the section V, which may but need not be subatmospheric. In either case there occurs within this section a mixture of vapor and liquid from which the latter is separated by centrifugal force and collected on the outer wall 10 while the vapor, entirely or substantially freed from the liquid, flows up through the riser ring 19. Further, the invention is applicable to simple flashing operations, wherein the section U is omitted.

Figure 2:
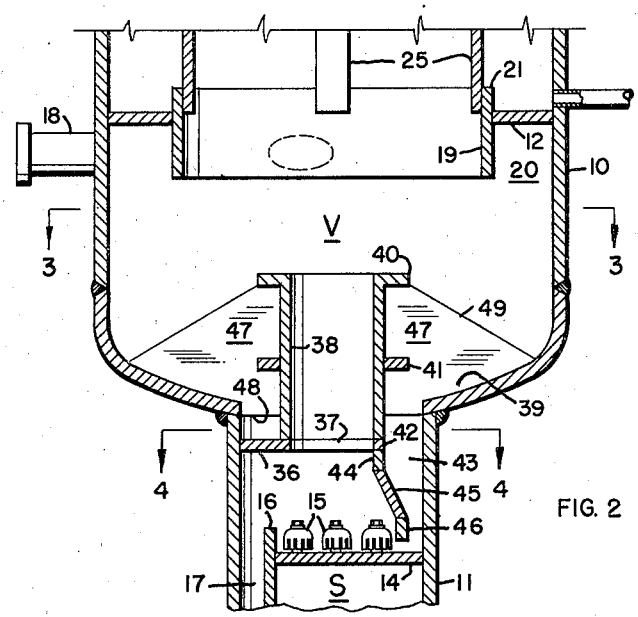
Figure 2 is an enlarged fragmentary view showing the details of the plate between the vortex and stripping sections.
Figure 3:
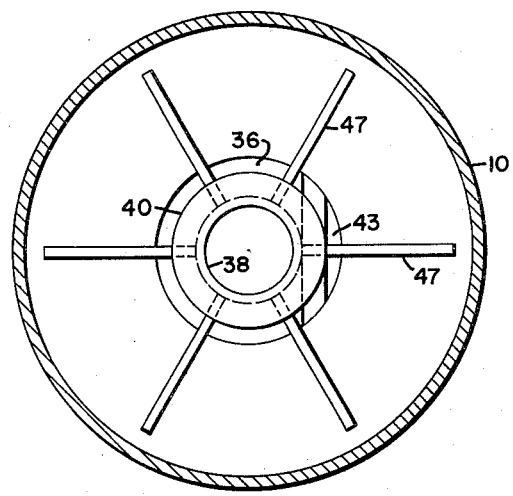
Figures 3 and 4 are transverse sectional views taken on the correspondingly numbered section lines of Figure 2.
Figure 4:
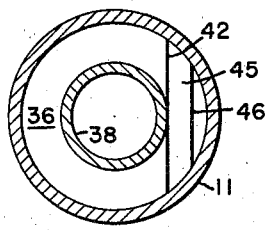

Considering now the particular improvement according to the invention, and shown in detail in Figures 2-4, a plate 36 is mounted in the stripping section S above the uppermost contacting tray 14 thereof. This plate defines the boundary between the sections V and S and has a central opening 37. Extending upwards about this opening is a tubular riser 38. This opening and the riser preferably are of ample diameter, e. g., from 0.4 to 0.7 of the diameter of the section S. The riser defines between itself and the outer walls 10 and 11 an annular liquid-collecting basin 39. The riser advantageously has a pair of peripheral, outwardly directed flanges 40 and 41, situated at respectively the top and at a lower level thereof for preventing the creep of liquid as described presently. The plate 36 has a downcomer for transporting liquid onto the uppermost contacting tray 14; to this purpose it terminates at an edge 42 to leave a segmental opening 43 and to this edge there is joined at the top a downcomer wall which includes an upper vertical plate 44, an intermediate inclined plate 45, and a lower vertical plate 46 close to the uppermost tray 14. For arresting the rotational movement of the liquid collected in the basin 39 the latter is provided with a plurality, e. g., six, vertical, radial vortex-breaker blades 47 that extend outward from the riser 38 to the enclosing walls 10 and 11. The blades have notches to accommodate the flange 41. These blades divide the collecting basin into a like number of circumferentially contiguous pockets only the two at the right, as seen in Figure 3, are in direct communication with the downcomer opening 43. To permit liquid from the other pockets to flow into the downcomer the blades 47 have their bottom edges 48 spaced from the plate 36 to provide flow passages. To avoid undue interference with the vortex of vapor and to reduce re-entrainment of separated liquid therein it is preferable to provide the blades with upper edges 49 that slope downwards from the top of the riser toward the outer wall.

Operation

In operation, the mixture to be fractionated is admitted through the tangential inlet 18 into the vortex section V to form a vortex that moves at first peripherally within the annular space 20 and progresses with a helix-like motion downwards. It will be understood that the mixture may initially contain liquid and vapor or that such a mixture may be formed by flashing of a part of the liquid when the section V is maintained at a pressure lower than that of the feed stream. Liquid is hurled against the wall 10 by centrifugal force and flows down into the basin 39, the rotational motion thereof being arrested and greatly reduced by the vortex-breaker blades 47. The liquid then passes on the plate 36 beneath the blades into the downcomer opening 43 and thence through the downcomer duct defined by the wall 11 on the one side and the walls 44-46 on the other onto the uppermost contacting tray 14 in the stripping section S. The gaseous mixture of stripping agent (introduced at 34 and volatile components liberated from the liquid thereby, flow off from the uppermost tray 14 through the opening 37 and riser 38 into the core of the vortex in the vortex section V to join the vapors therein. These vapors, after moving helically downward as described above, reverse direction and move upwards into the ring 19 together with the said gaseous mixture and enter the upper distillation section U through the tangential vapor passages between the louvers 25.

Considering now the advantages of the several features according to the invention, it is noted that the gaseous mixture from the stripping section S is transferred upwards into the vapor vortex within the vortex section V through a riser 38 independently of and out of contact with the liquid, which collects outside of the riser and flows through the downcomer opening. This minimizes the opportunity of entrainment of the descending liquid by the ascending gaseous mixture, as in known arrangements. Such liquid, if entrained, is not effectively separated by centrifugation and a part of it is then carried off into the ring 19 and upper section U.

Since the plate 36 does not achieve any contacting between stripping agent and liquid, it is desirable to reduce the residence time of the liquid thereon. This is achieved by avoiding an overflow weir at the inlet opening 43 of the downcomer, so that the plate is unobstructed for the free drainage of liquid into the downcomer.

The rotational motion of the liquid and of the vapors causes liquid to creep up along the outside of the tube 38, where it tends to be entrained in the ascending gaseous mixture. This is especially the case when the vortex-breaker blades 47 are omitted but occurs also to some degree with the blades. The outwardly directed flanges 40 and 41 greatly reduce the amount of such creeping liquid that reaches the inside of the riser 38.

The vortex-breaker blades 47 arrest the rotational motion of the liquid and thereby facilitate the drainage thereof into the collecting basin on the plate 36. The effect of this is that the liquid is more rapidly removed from the action of the vapor vortex and the tendency toward re-entrainment is reduced. By sloping the upper edges 49 downwardly as shown the flow patterns of the vapor vortex are less affected, resulting in increased rotational speed and higher centrifugal forces. Another adverse effect avoided by such sloping edges is that caused by eddy currents that tend to re-entrain liquid.

Example

Both radioactive tracer and asphaltene analyses were made on two forms of the distillation apparatus shown in Figure 1, following runs under identical conditions. The column 10 had an internal diameter of 21 ft., the tangential inlet 18 was 2 ft. in diameter and the height of the vortex section V was 11 ft. 7 in. from the plate 12 to the top of the column 11. In the first form, indicative of the prior art construction, the stripping section contained four bubble cap trays, the upper one being near the top of the section 11, above which was mounted a cross of six vortex-breaker blades about one foot in height extending radially out to the edge of the tray; liquid therefore flowed onto the top tray from the sides of the wall 10 in contact with gaseous mixture passing up from the bubble caps. The second form corresponded to the arrangement of the invention shown in the appended drawings, the dimensions being related to those stated above in the manner shown in Figures 2 and 3.

In these runs topped crude having an A. P. I. gravity of about 13 was admitted through the inlet 18 at a temperature of about 730° F., the pressure in the section V being about 43 mm. Hg. Steam was admitted through the inlet 34 and lime was admitted through the pipe 33a to react with naphthenic acids, which were withdrawn via pipe 22 as calcium naphthenate.

Analyses indicated the following entrainments of liquid from the vortex section V into the upper section U:

|  | First Form, Percent | Second Form (Invention), Percent |
| --- | --- | --- |
| Asphaltene Analysis | 3.2 | 1.85 |
| Radioactive Tracer Analysis | 1.25 | 0.99 |

Thus, each method of analysis shows a substantial reduction in entrainment as a result of the construction disclosed here. Of the two methods, the asphaltene method is considered to be more reliable.

A further advantage attained by the construction of the invention is that the column is more stable in operation that that according to the first form.

We claim as our invention:

1. In distillation apparatus including walls enclosing a vortex section and, at the bottom thereof, a stripping section, said vortex section having a tangential side inlet and a vapor outlet at the top, and said stripping section containing gas-liquid contacting trays and, beneath said trays, means for supplying a stripping medium and a residue outlet, the improvement comprising: a horizontal plate between said vortex and stripping sections having a central opening, a tubular riser extending upwards from said plate about said opening and defining an annular liquid-collecting basin surrounding the riser, said riser interconnecting said stripping and vortex sections for the upward transfer of gas; and a downcomer duct interconnecting said basin to the uppermost tray in the stripping section.

2. Distillation apparatus according to claim 1, wherein the said tubular riser has a peripheral, outwardly directed flange at the top thereof.

3. Distillation apparatus according to claim 1, wherein the top of said downcomer duct is situated at the level of the top of said plate, said plate being unobstructed at the said level, for the free drainage of liquid thereon into the downcomer.

4. In combination with the distillation apparatus according to claim 1, a plurality of vortex-breaker blades in said liquid-collecting basin.

5. Distillation apparatus according to claim 4, wherein said vortex-breaker blades have upper edges sloping substantially from the top of said tubular riser downwards towards said enclosing wall.

6. Distillation apparatus according to claim 4, wherein said tubular riser has a plurality of peripheral, outwardly directed flanges, one flange being situated substantially at the top of the riser and another at a level intermediate said plate and the said one peripheral flange and extending into notches in the radially inner edges of said blades.

7. Distillation apparatus according to claim 4, wherein the said downcomer is situated in direct liquid-receiving relation to at least one but less than all of the pockets between adjacent vortex-breaker blades, said blades providing flow passages at a level substantially at said plate for the flow of liquid between pockets.

8. A fractional distillation apparatus including: an upper distillation section, a lower stripping section, and an intermediate vortex section in flow communication with the other sections, said stripping section having a diameter less than that of the other two sections, said upper and lower sections having horizontal gas-liquid contacting trays; tangential inlet means for feeding a mixture to be distilled into the vortex section to form a vortex and effect separation of liquid from vapor; means beneath the trays in the stripping section for supplying a stripping medium and for discharging residue; means above the trays of the distillation section for supplying reflux liquid and for discharging vapor; a horizontal plate mounted within the stripping section above the contacting trays thereof and a short distance below the vortex section having a central opening of diameter between about 0.4 and 0.7 of the diameter of the stripping section; a tubular riser extending upwards from said plate into the vortex chamber about said opening and defining an annular liquid-collecting basin surrounding the riser, said riser interconnecting said stripping and vortex sections for the upward transfer of gas; a plurality of vortex-breaker blades in said basin extending from said tubular riser across the said annular basin, the upper edges of said blades being inclined downwards from the top of the riser and the lower edges providing clearance spaces above said plate for the free flow of liquid between the pockets defined by the said blades; and a liquid downcomer duct having an intake at the level of said plate for free drainage of liquid therefrom and an exit on the uppermost contacting tray of the stripping section situated at one side of the last-mentioned tray.

References Cited in the file of this patent

UNITED STATES PATENTS

| 2,018,309 | Jones | Oct. 22, 1935 |
| 2,658,863 | Guala | Nov. 10, 1953 |
| 2,713,023 | Irvine | July 12, 1955 |